US005781715A

United States Patent [19]
Sheu

[11] Patent Number: 5,781,715
[45] Date of Patent: Jul. 14, 1998

[54] FAULT-TOLERANT BRIDGE/ROUTER WITH A DISTRIBUTED SWITCH-OVER MECHANISM

[75] Inventor: Tsang-Ling Sheu, Cary, N.C.

[73] Assignee: International Business Machines Corporation, Armonk, N.Y.

[21] Appl. No.: 958,418

[22] Filed: Oct. 13, 1992

[51] Int. Cl.$^6$ .......................... G01K 31/08; G06F 11/00
[52] U.S. Cl. .................. 395/182.02; 370/217; 370/220; 370/221; 370/225; 370/228
[58] Field of Search .................. 370/16; 340/825.01; 371/8.1, 8.2, 9.1, 11.1, 11.2, 11.3; 395/182.01, 182.02, 182.08, 182.09, 182.11

[56] References Cited

U.S. PATENT DOCUMENTS

| | | | |
|---|---|---|---|
| 4,306,313 | 12/1981 | Baldwin | 359/177 |
| 4,837,856 | 6/1989 | Glista, Jr. | 359/110 |
| 4,847,837 | 7/1989 | Morales et al. | 371/8.7 |
| 4,897,841 | 1/1990 | Gang, Jr. | 370/401 |
| 4,984,240 | 1/1991 | Keren-Zvi et al. | 371/8.2 |
| 5,016,244 | 5/1991 | Massey, Jr. et al. | 370/217 |
| 5,088,091 | 2/1992 | Schroeder et al. | 370/94.3 |
| 5,103,446 | 4/1992 | Fischer | 370/85.1 |
| 5,132,962 | 7/1992 | Hobgood et al. | 370/16.1 |
| 5,161,156 | 11/1992 | Baum et al. | 371/7 |
| 5,198,808 | 3/1993 | Kudo | 340/825.8 |
| 5,200,949 | 4/1993 | Kobayashi | 370/16 |
| 5,218,600 | 6/1993 | Schenkyr et al. | 370/16 |
| 5,218,601 | 6/1993 | Chujo et al. | 370/16 |
| 5,239,537 | 8/1993 | Sakauchi | 370/16 |

FOREIGN PATENT DOCUMENTS

1263760  12/1989  Canada .................. 354/233

OTHER PUBLICATIONS

George Varghese, "Transparent Interconnection of Incompatible LAN Using Bridges", vol. 8 No. 1, Jan '90.
Ron Liften, "RND's Ethernet Brouter Family–An Inside Look", Oct. '89, vol. 12 No. 5.
Magda el Zarki, "A Distributed Routing Scheme for Networks of the Future", 1990, pp. 81–87.
Debbie Shimman, "Enter The Brouter: An Update on Linking LANs", Nov. '88, pp. 38–43.
IBM Tech Bulletin, "Token Ring Communications for Power/Logic Monitoring in Large Computer Systems", Nov. '90, vol. 33 No. 64.
Lurie, "Wellfleet BN Routers", 1992.
Brunner et al., "Fault Tolerant Interconnect . . . ", 0-430-569-41, Nov. 21, 1990.

*Primary Examiner*—Robert W. Beausoliel, Jr.
*Assistant Examiner*—P. Vales
*Attorney, Agent, or Firm*—Stephen T. Keohane; John J. Timar

[57] ABSTRACT

A fault-tolerant bridge/router ("brouter") with a distributed switch-over mechanism of the present invention can tolerate any single failures and does not rely on network reconfiguration (or alternative paths) and, therefore, substantially improves system reliability/availability. The fault-tolerant brouter utilizes a plurality of processing elements communicating through a multiple-bus switching fabric. Each processing element can effectively support two ports, each port providing an interface to an individual LAN. Each LAN is then linked to two different ports on two different processing elements, respectively, thereby providing processing element redundancy. If a processing element fails, bridging/routing functions can be performed by the other, redundant processing element. The functions are switched using the switch-over mechanism. Because the switch-over mechanism is distributed, no centralized control mechanism is required.

The fault-tolerant brouter of the present invention provides the prevention of packet loss so that a source station does not have to resend lost packets blocked due to a failed processing element and provides transparency to end stations so that the packet recovery is independent of the networking protocols implemented. In addition, due to the redundancy of the processing elements for each LAN, traffic from unlike LANs with different media speeds can be evenly balanced. In this manner, the fault-tolerant brouter of the present invention provides significant improvement in system reliability and availability.

11 Claims, 6 Drawing Sheets

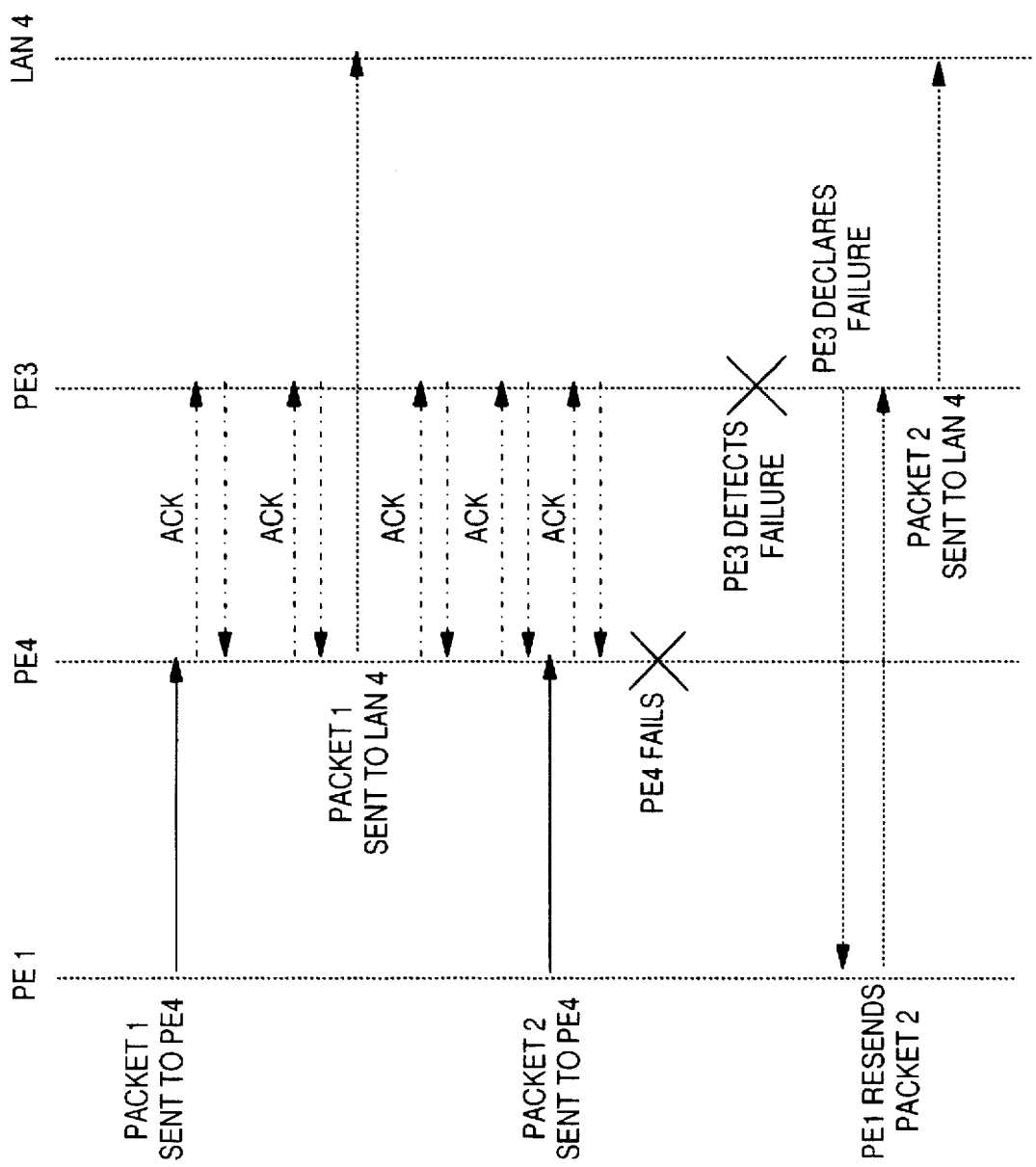

5,781,715

1

FAULT-TOLERANT BRIDGE/ROUTER WITH A DISTRIBUTED SWITCH-OVER MECHANISM

BACKGROUND OF THE INVENTION

I. Field of the invention

The present invention relates to local area network (LAN) internet-working and, more particularly, to a method and apparatus for internet-working two or more LANs while preventing packet loss so that source stations do not have to resend lost packets and while maintaining transparency to the end stations so that packet recovery is independent of the various networking protocols.

II. Prior Art

As networks have grown, and particularly as local area networks (LANs) have come into widespread use, many organizations have ended up with confederations of individual networks running in different places. For example, a single organization may have dozens of LANs running in as many as two or three dozen areas of a city or even a country. This distribution of individual networks complicates the network communication as stations on one network often need to communicate with stations on other networks.

A bridge/router ("brouter") is a device that interconnects two or more LANs at the media access control/network layer (of the OSI reference model). A brouter allows stations on one LAN to connect to stations on different LANs. As shown in FIG. 1, brouter 10 is used to interconnect four LANs, LAN1, LAN2, LAN3 and LAN4. Although the number of LANs a brouter can interconnect can be much greater, four is used as an example. A brouter comprises a number of adapters, or processing elements, for interfacing the various LANs. In this case, brouter 10 comprises adapters 12, 14, 16 and 18 for interfacing with LAN1, LAN2, LAN3 and LAN4, respectively. Using brouter 10, a station on LAN1 may communicate with a station on LAN2 or LAN3, and so forth, so long as the LAN networking protocols are compatible.

There is a problem, however, when one of the adapters goes down in the brouter, especially when there is ongoing communication taking place between stations on two different LANs. Presently, if an active adapter goes down, the communication is interrupted and must be re-established by the particular networking protocol being utilized, normally by setting up a different path between the two stations. For example, today's bridging/routing protocols, such as source routing bridging, transparent bridging, TCP/IP, DECnet, AppleTalk, etc., guarantee path availability through an alternative route, when the original route fails. But, such network configuration is highly costly in terms of time lost. For instance, the reconfiguration cost includes the reestablishment of routing tables inside a brouter, the discovery of a new path, and the resending of the blocked messages from the source stations. Such network reconfiguration considerably increases end-to-end packet latency time and creates unexpected network congestion on the available paths. In addition, a second route may not exist to provide end-to-end communication when a brouter on the first route fails.

SUMMARY OF THE INVENTION

A fault-tolerant bridge/router ("brouter") with a distributed switch-over mechanism of the present invention can tolerate any single failures and does not rely on network reconfiguration (or alternative paths) and, therefore, substantially improves system reliability/availability. The fault-tolerant brouter utilizes a plurality of processing elements

2 communicating through a multiple-bus switching fabric. Each processing element can effectively support two ports, each port providing an interface to an individual LAN. Each LAN is then linked to two different ports on two different processing elements, respectively, thereby providing processing element redundancy. If a processing element fails, bridging/routing functions can be performed by the other, redundant processing element. The functions are switched using the switch-over mechanism. Because the switch-over mechanism is distributed, no centralized control mechanism is required.

The fault-tolerant brouter of the present invention provides the prevention of packet loss so that a source station does not have to resend lost packets blocked due to a failed processing element and provides transparency to end stations so that the packet recovery is independent of the networking protocols implemented. In addition, due to the redundancy of the processing elements for each LAN, traffic from unlike LANs with different media speeds can be evenly balanced. In this manner, the fault-tolerant brouter of the present invention provides significant improvement in system reliability and availability.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 6 is a diagram showing the flow of messages and transfer of data between a LAN and the various processing elements during a switch-over due to a receiving processing element failure.

DETAILED DESCRIPTION OF THE PREFERRED EMBODIMENT

Figure 1:
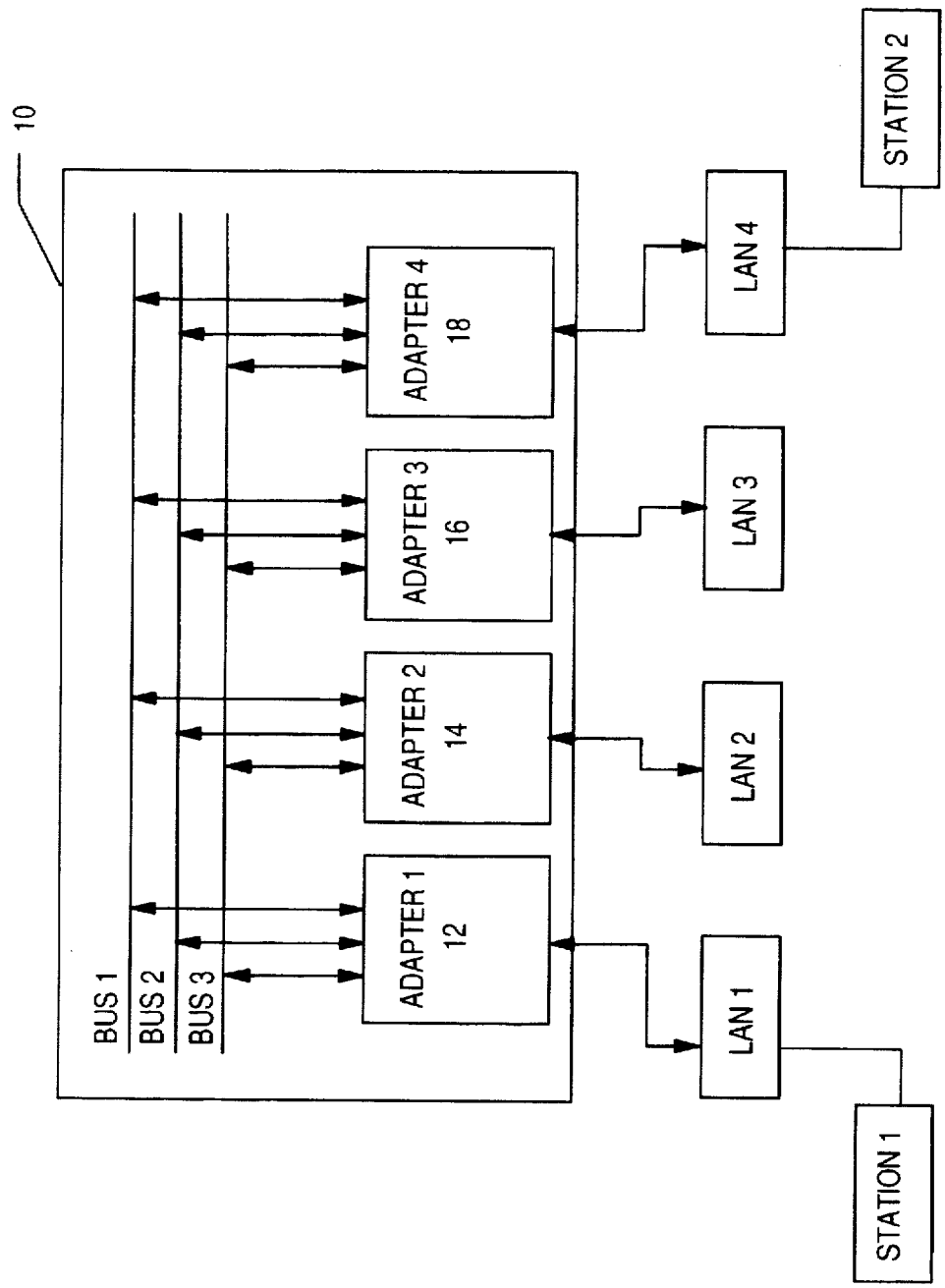
FIG. 1 is a block diagram of a computer network, showing a number of LANs being interconnected by a brouter of prior art.
Figure 2:
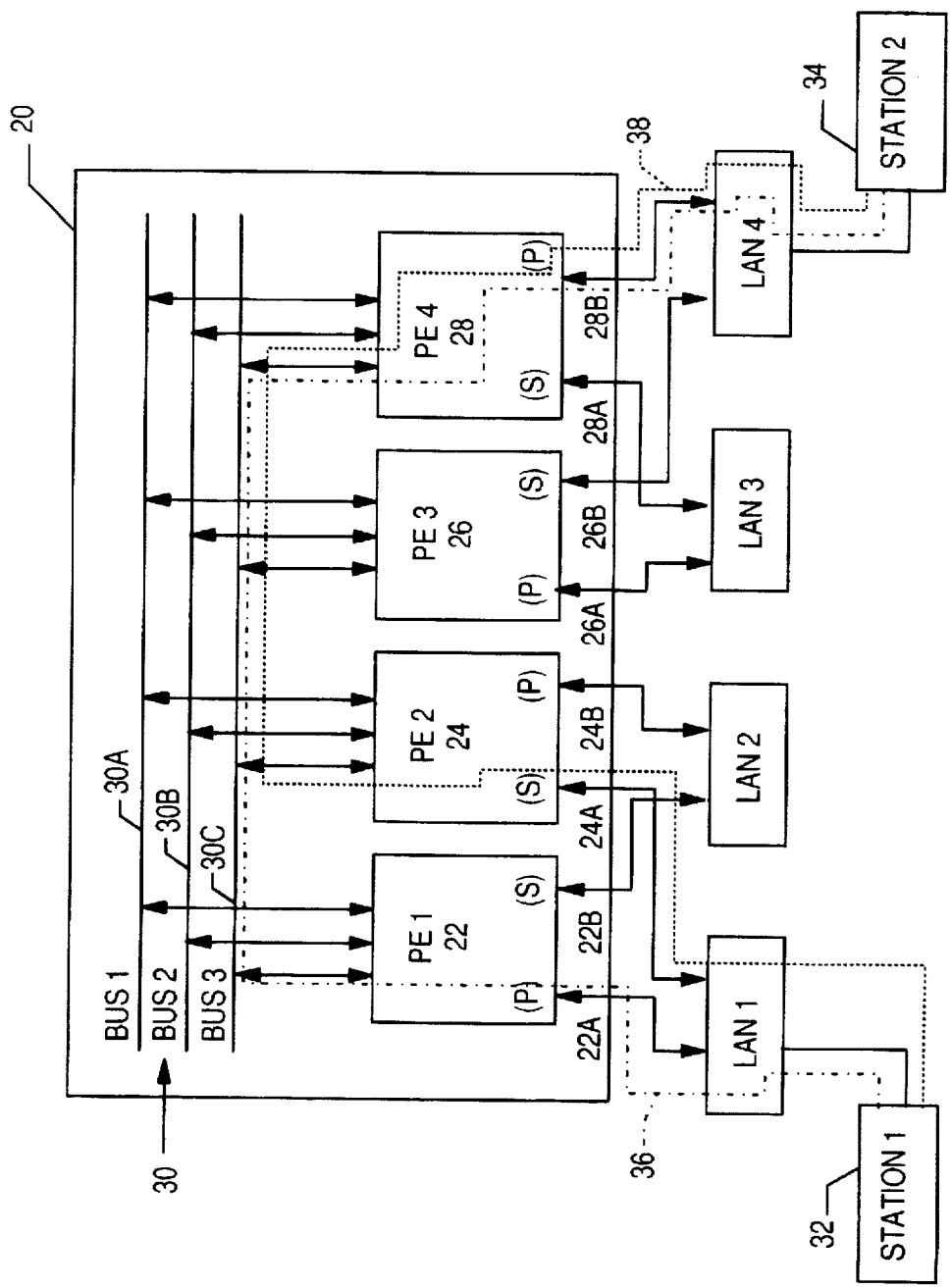
FIG. 2 is a diagram showing the fault-tolerant bridge/router of the present invention.

Referring to FIG. 2, therein is illustrated a block diagram of the fault-tolerant bridge/router ("brouter") 20 of the present invention. Brouter 20 comprises a plurality of processing elements (PE1, PE2, PE3, and PE4) 22, 24, 26 and 28, for interfacing with LANs 1, 2, 3, and 4, respectively. The fault-tolerant bridge/router of the present invention may have many more processing elements for interfacing with even more LANs but, for simplicity, four processing elements are shown as an example.

Each processing element 22, 24, 26, and 28 has two LAN input/output (I/O) ports, 22a and 22b, 24a and 24b, 26a and 26b, and 28a and 28b, respectively. Each LAN I/O port provides an interface to an individual LAN. As denoted by (P) and (S), each processing element comprises a primary I/O port (P) and a secondary I/O port (S). As can be seen in the figure, each LAN 1, 2, 3, and 4 is connected to two different I/O ports, a primary and a secondary, on two different processing elements. In other words, each LAN is connected to a primary I/O port on one processing element and to a partner secondary I/O port on another processing element. In operation, the primary I/O port, as the name implies, is the primary port for interfacing with the respective LAN while the secondary port is utilized if its partner primary port goes down.

All of the processing elements are interconnected through a multiple-bus switching fabric 30 comprising three buses 30a, 30b and 30c. Again, the number of buses utilized within the brouter can be any number and, for simplicity, three buses are used in this example. Each bus 30a, 30b and 30c is connected to each processing element 22, 24, 26, and 28.

Generally, the brouter of the present invention operates as illustrated in the following example. A source station 32 attached to LAN 1 wishes to deliver a sequence of packets to a destination station 34 attached to LAN 4. As shown in the figure, LAN 1 is attached to two I/O ports, primary port 22a of processing element 22 and secondary port 24a of processing element 24. Primary port 22a and secondary port 24a are "partner" ports receiving identical information. Likewise, LAN 4 is connected to a primary I/O port 28b of processing element 28 and a partner secondary I/O port 26b of processing element 26. In normal operation, the sequence of packets from source station 32 is routed through primary I/O port 22a and processing element 22, through the multiple-bus switching fabric 30 (for example, through bus 30c), and through primary I/O port 28b of processing element 28. This packet sequence transfer is denoted by the dashed line 36.

Both brouter I/O ports 22a (primary) and 24a (secondary) copy the packets into processing elements 22 and 24, respectively. Because multiple copies of an arriving packet is not allowed, only port 22a (primary port for LAN 1) will process the packet and perform the packet forwarding. After performing the required functions (to be discussed), processing element 22 selects a bus, e.g., bus 30c, from the multiple bus switching fabric and transmits the packet to the destination LAN (LAN 4 in this example). As can be seen, two brouter I/O ports 26b (secondary) and 28b (primary) can be used to send out the packet to LAN 4. However, in normal operation, only primary port 28b is selected. The selection of primary ports ensures that station 34 attached to LAN 4 will receive just one copy of each packet.

DISTRIBUTED SWITCH-OVER MECHANISM

When a processing element or an I/O port fails, a switch-over mechanism is employed to dynamically switch the function from the failed primary I/O port and processing element to the other partner secondary port and processing element. The control functions are distributed among the processing elements so that no centralized control mechanism is required. Also, the switch-over is transparent to the source station so that no packet needs to be resent from the source station in the case of processing element failure.

The switch-over mechanism generally operates as follows. A packet from a LAN arriving at the brouter is copied by the pair of processing elements, but only the processing element which owns the primary port for that LAN processes and forwards the packet. The processing element that owns the secondary I/O port for that LAN holds the packet for a period of time. In the case that the former fails, the latter will resume the processing and forwarding of the packet. Assuming processing element 22 of the present example failed, the packet sequence transfer is indicated by dashed line 38.

This is accomplished by messages which are exchanged between the processing element pair (one processing element owning the primary port, the other owning the secondary port) during the processing of a packet. In particular, the messages are acknowledgment (ACK) signals which are exchanged periodically between the two processing elements. When a processing element fails, it will stop sending ACKs thereby indicating to the partner processing element that it has failed. This will be discussed in greater detail.

IMPLEMENTATION OF A PROCESSING ELEMENT

Figure 3:
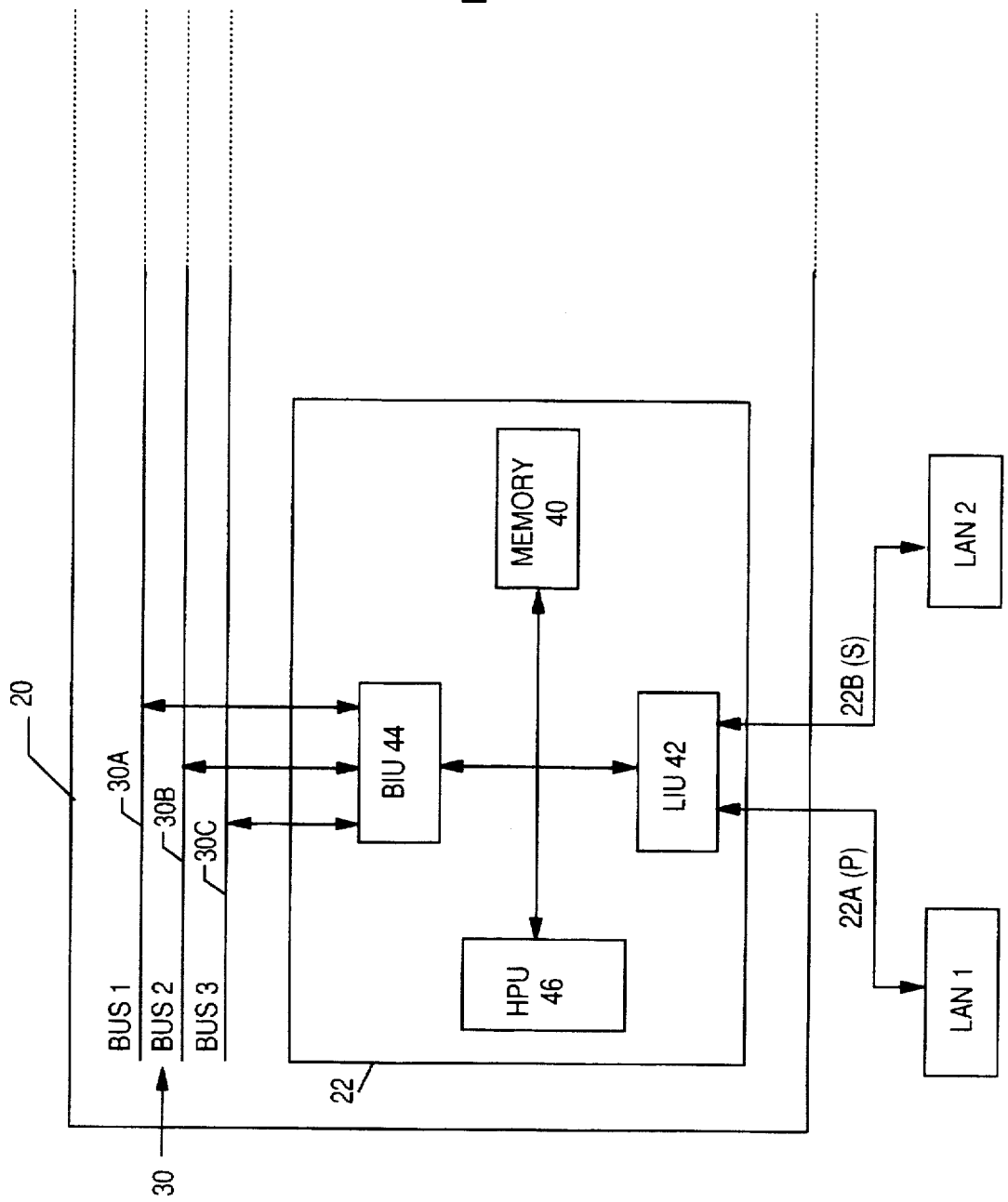
FIG. 3 is a block diagram showing a processing element of the fault-tolerant bridge/router of the present invention.

FIG. 3 illustrates a portion of brouter 20 of FIG. 2 showing the processing element of the present invention. Processing element 22 of FIG. 2 is used for illustration although each processing element comprises the same functional units. As can be seen, processing element 22 comprises a memory 40 and three functional units: LAN-Interface Unit (LIU) 42; Bus-Interface Unit (BIU) 44; and Header Processing Unit (HPU) 46. Memory 40 provides internal memory for the processing element 22. LIU 42 transmits and receives packets to and from LANs via I/O ports 22a and 22b. BIU 44 transmits and receives packets to and from another processing element through the multiple-bus switching fabric 30 and is connected thereto. HPU 46 performs table look-up and updating, required header modifications and internal processing element control functions.

In addition to providing temporary local storage for the processing element, memory 40 maintains two tables which are used for keeping track of which packet has been received and which packet has been sent. As each packet has an identifying, or packet number in its header, the packet number is used to identify the particular status of that packet. Each table has n−1 entries ("In" representing the number of processing elements in the brouter). In the present example, each table would have three entries as there are four processing elements in brouter 20. The two tables maintained in memory 40 are a Receiving Counter Table (RCT) for maintaining the numbers of packets received by a particular processing element and a Sending Counter Table (SCT) for maintaining the numbers of packets that the particular processing element has sent out.

An example of an RCT and an SCT maintained by processing element 22 (PE1) is shown in Table 1. As illustrated, the RCT indicates that PE1 has received the ninth packet of a sequence of packets (or message) from PE2, the third packet of a message from PE3 and the 101st packet of a message from PE4. Likewise, the SCT indicates that PE1 has transmitted the 120th packet of another message to PE2, the 25th packet of another message to PE3, and the 50th packet of another message to PE4.

TABLE 1

| Receiving Counter Table | | | |
|---|---|---|---|
| PE Number | PE2 | PE3 | PE4 |
| Packet Number | 9 | 3 | 101 |
| Sending Counter Table | | | |
| PE Number | PE2 | PE3 | PE4 |
| Packet Number | 120 | 25 | 50 |

Generally, the operation of processing element 22 is as follows. A packet is received by LIU 42 from LAN 1 through I/O port 22a and is temporarily stored in memory 40. HPU 46 fetches the packet header from memory 40 and performs the bridging/routing functions (such as header processing and table look-up). After the HPU 46 decides where the destination output port is from its routing table, it returns the header, to memory 40. If the destination output port is located on another processing element, then BIU 44 requests a bus (from a bus controller (not shown in figure)) and transmits the packet from memory to another BIU of the destination processing element. If the destination output port is port 22b, LIU 42 fetches the packet from memory 40 and sends it out to LAN 2 via port 22b.

Distributed Fault Diagnosis and Packet Recovery

As was discussed above, messages are exchanged between partner processing elements so that, when a processing element fails, its partner processing element can diagnose that failure and recover the packets which were to be sent or received by the failed processing element.

Messages exchanged between the partner PEs are conveyed over one of the buses in the multiple bus switching fabric 30 and are processed by the HPUs of the respective PEs. Timing for the brouter is provided by a system clock not shown in the figures.

Figure 4:
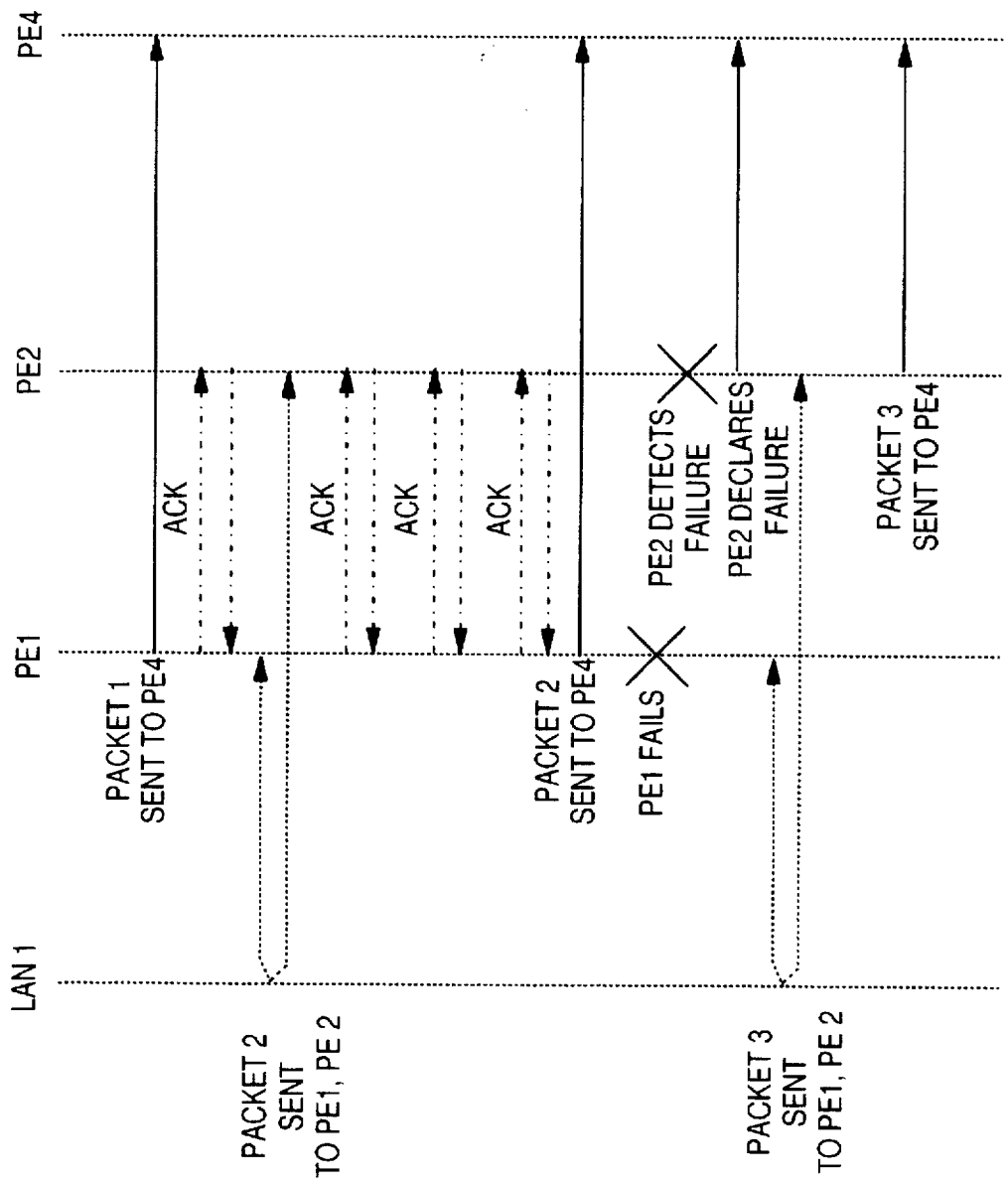
FIG. 4 is a diagram showing the flow of messages and transfer of data between a LAN and the various processing elements during a switch-over due to a sending processing element failure.
Figure 5:
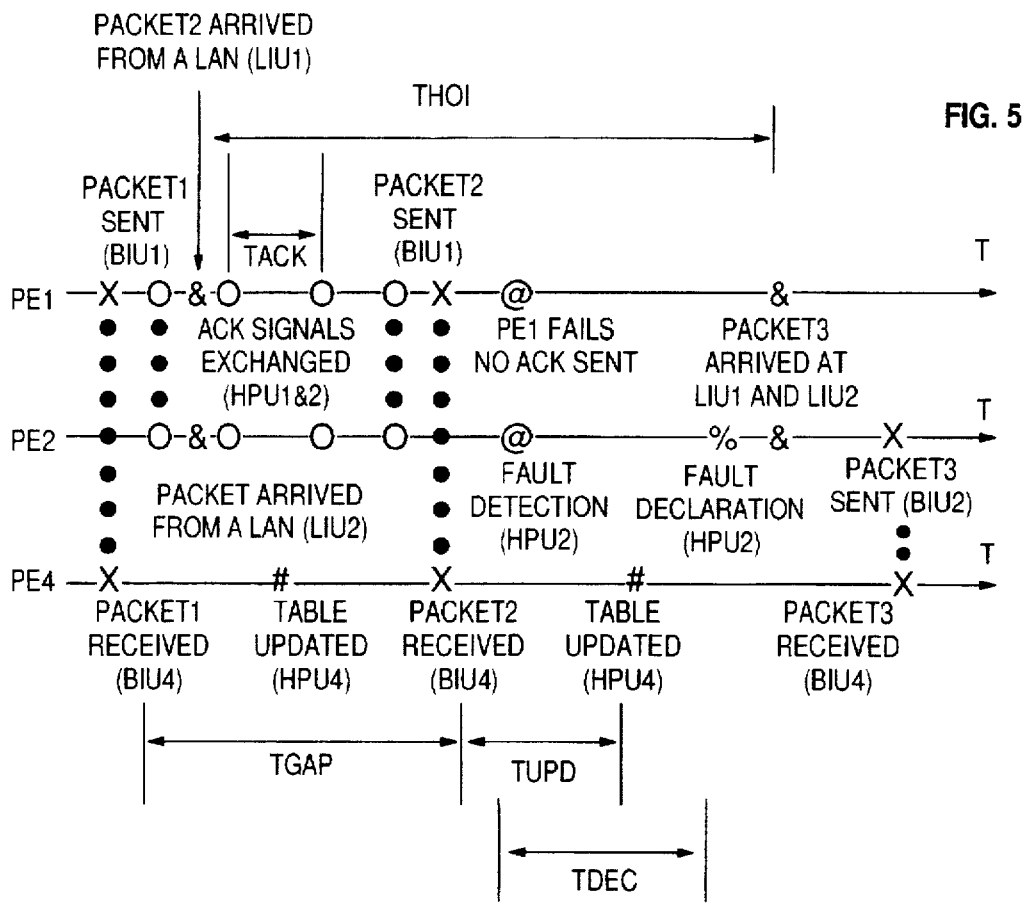
FIG. 5 is a timing diagram showing messages which are exchanged between processing elements during the same switch-over due to a sending processing element failure.

FIGS. 4 and 5 illustrate the message and data flows between processing elements and the corresponding timing in an example situation where the sending processing element fails. In this example situation, processing element 22 (PE1) is receiving a sequence of packets from station 1 on LAN 1 and sending the sequence of packets to processing element 28 (PE4) for being forwarded to station 2 on LAN 4. The packet sequence transfer path is illustrated as path 36 in FIG. 2. As shown in FIG. 2, PE2 is the partner processing element having port 24a as the secondary I/O port to LAN 1. To illustrate the distributed fault diagnosis and packet recovery, PE1 is shown to fail during packet transfer.

Referring first to FIG. 4, packet 1, which had already been received by PE1, is transferred from PE1 to PE4. Acknowledgement messages (ACKs) are periodically exchanged between partner processing elements, in this case, PE1 and PE2 over one of the buses of the multiple bus switching fabric 30. Packet 1 is simultaneously transferred from LAN 1 to both PE1 and PE2 and are received by the processing elements'respective LIUs. As discussed above, the processing element owning the primary port (PE1) temporarily stores the packet in memory, the HPU fetches the packet header and performs the bridging/routing functions. If the destination output port is located on another processing element (PE4, in this case), BIU requests a bus and transmits the packet from memory to the BIU of the receiving processing element (PE4). The processing element owning the secondary I/O port (PE2) stores the packet in memory for a predetermined period of time thereby ensuring that proper packet transfer can take place even where the sending processing element (PE1) fails.

As can be seen, more ACKs are exchanged between the partner processing elements, PE1 and PE2, while PE1 is processing packet 2. Packet 2 is then transferred to PE4 by PE1. PE1 then fails as denoted by the "X". PE2 detects the failure as no ACK is sent from PE1 and PE2 times out. PE2 then declares the failure of PE1 to all PEs in the brouter. Packet 3 is then sent to PEI and PE2 from station 1 on LAN1, is processed by PE2 and transferred to PE4 by PE2. All subsequent packets from station 1 on LAN 1 to station 2 on LAN 2 are transferred via PE2 until PE1 is repaired.

FIG. 5 also illustrates the message and packet transfers but, in addition, shows the timing of the various operations performed during these transfers. The timing parameters used in FIG. 5 are defined as follows:

1. Tack=the time interval between two acknowledgement signals between processing elements (PEs);
2. Tupd=the time interval from when a packet is received (or sent) by a processing element to when the counter table (RCT or SCT) is updated by the same PE;
3. Tdec=the time interval from when a PE failure is detected by the partner PE to when the fault is declared by the partner PE;
4. Tgap=the time interval from the end of one packet being received (or sent) to the beginning of another packet being received (or sent);
5. Thok=the time required for a sending PE (owns the primary port for a LAN) to hold a packet;
6. Thol=the time required for a back-up sending PE (owns the secondary port for a LAN) to hold a packet.

In addition, the following symbols are used in FIG. 5 to make the distinction between various packet and message transfers more clear:

1. X=packet transferred between PEs;
2. 0=ACK sent or received;
3. &=packet transferred between a LAN and a PE;
4. @=PE failure and detection;
5. %=PE failure declaration; and
6. #=table (RCT or SCT) update.

Initially, packet 1, already received and processed by PE1, is transferred to PE4 at "X". ACKs are exchanged between partner PEs, PE1 and PE2 at "0". Packet 2 is simultaneously sent from LAN 1 to PE1 and PE2 at "&". Three ACKs are exchanged between PE1 and PE2. Tack is the period of time between ACKs. PE4 receives packets every Tgap interval from PE1 and updates its RCT (at "#") within Tupd interval. Packet 2 is sent to PE4 by PE1 at "X". PE1 fails at "@" and sends no ACK to partner PE2 thereby allowing PE2 to detect the failure (within two ACK periods, 2 X Tack). PE2 declares the fault at "%" to all PEs in the brouter. Once the fault is detected, the message is propagated to the rest of PEs. This time interval is referred to as a fault declaration interval. During the fault declaration interval, Tdec, PE2 performs the following two operations:

- broadcasts a message to the rest of PEs, indicating that PE1 has failed; and
- polls the packet numbers under PE1 entries of the RCTs maintained by all other PEs (other than PE1 and PE2).

Now that PE2 acquires the packet numbers from the polling, it can start processing and forwarding packets to PE4. The packets originally sent by PEI are now delivered by PE2. To guarantee a successful switch over, it is required that each packet be held in the local memory of PE2 (the back-up sending PE) for Thol interval.

A Receiving PE Failure

Figure 7:
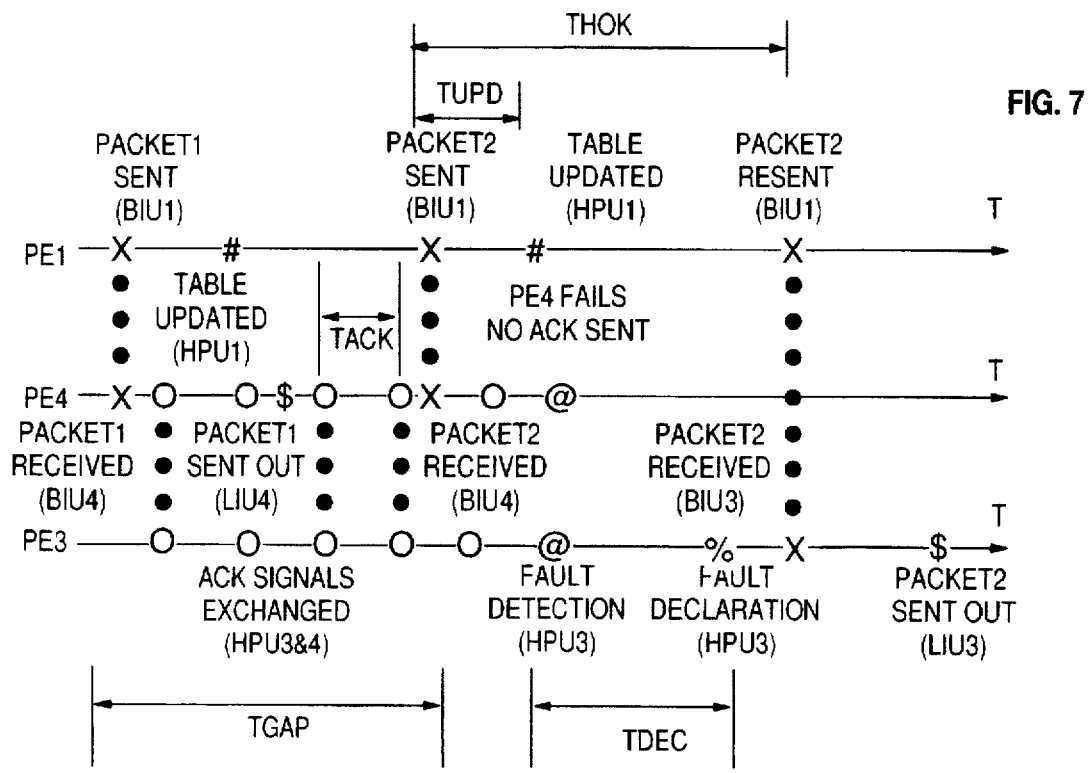
FIG. 7 is a timing diagram showing messages which are exchanged between processing elements during the same switch-over due to a receiving processing element failure.

FIGS. 6 and 7 show message and packet transfer flows and the corresponding timing diagram, respectively, when a receiving PE (PE4 in this example) fails during the receipt of a packet from PE1. PE3 acts as a back-up receiving PE to take over the functions from PE4 whenever the latter fails. Note that HPUi BIUi, and LIUi are three functions units of PEi. where i=1, 3, or 4.

As discussed above, during a normal operation, partner PEs, PE3 and PE4, exchange ACK signals periodically (with a period Tack);

PE4 receives packets every Tgap interval from PE1;

PE1 updates its SCT within Tupd interval; and PE3 detects the fault when there is no ACK signal sent out from PE4 within two Tack periods.

During the fault declaration interval, Tdec, PE3 broadcasts a message to the rest of PEs, indicating that PE4 has failed. When PE1 receives the message, it reads the packet number from its SCT and resends the packet to PE3. The packets originally sent out to a LAN by PE4 is now sent out by PE3. Note that each packet has to be held in the local memory of the sending PE (PE1) for Thok interval. The packet-held interval (Thok) is counted from the first packet sent (to PE4) to the packet resent (to PE3) in the case that PE4 is faulty.

The distributed fault diagnosis works only if the above six timing parameters meet the relation specified by the following inequality:

$$Tack < Tupd < Tdec < Tgap < Thok < Thol$$

The reason for Tdec>Tupd>Tack is to prevent from any packet loss when there is a PE failure. The reason for Tdec<Tgap is to timely isolate the failed PE before it sends or receives more packets. Thok and Thol have to be greater than Tgap so that the held packets can be used for backup before they are discarded. Finally, Thol is greater than Thok because the former is counted from the packet arriving at a brouter port while the latter is counted from the packet sent by a sending PE.

Thus, it can be seen that the fault-tolerant brouter with a distributed switch-over mechanism of the present invention can tolerate any single failures and does not rely on network reconfiguration (or alternative paths) and, therefore, substantially improves system reliability/availability. Because the switch-over mechanism is distributed, no centralized control mechanism is required.

The fault-tolerant brouter of the present invention provides the prevention of packet loss so that a source station does not have to resend lost packets blocked due to a failed processing element and provides transparency to end stations so that the packet recovery is independent of the networking protocols implemented. In addition, due to the redundancy of the processing elements for each LAN, traffic from unlike LANs with different media speeds can be evenly balanced. In this manner, the fault-tolerant brouter of the present invention provides significant improvement in system reliability and availability.

While the invention has been particularly shown and described with reference to preferred embodiments thereof, it will be understood by those skilled in the art that various other changes in form and detail may be made without departing from the spirit and scope of the invention.

What is claimed is:

1. An apparatus for providing fault-tolerant communication between a plurality of stations connected thereto, said apparatus comprising:

a plurality of primary processing elements (PEs) and partner PEs, each primary PE having a primary interface for being connected to a station, and each primary PE having a partner PE having a secondary interface for being connected to said same station;

means, connected to said primary PEs and said partner PEs, for conveying data therebetween;

each primary PE further having means for receiving data from said primary interface and from said conveying means, having means for processing received data, and having means for sending processed data to said primary interface and said conveying means;

each partner PE further having means for receiving data from said secondary interface and from said conveying means, having means for storing received data, having means for retrieving stored data from said storing means and for processing retrieved data, and having means for sending processed data to said secondary interface and said conveying means, said partner PE retrieving, processing and sending means normally being in an inactive state;

means, connected to said primary PEs, for determining a primary PE failure; and means responsive to said determining means determination of a primary PE failure for activating said partner PE retrieving, processing and sending means of the partner PE of said failed primary PE.

2. The apparatus as defined in claim 1, wherein said plurality of primary PEs and partner PEs comprise a plurality of PEs, each PE comprising a primary PE and a partner PE of another primary PE.

3. The apparatus as defined in claim 2, wherein each PE has a line interface unit for providing said primary interface of said primary PE and for providing said secondary interface for said partner PE of another primary PE, each partner PE storing means comprising a memory for providing storage for said partner PE of another primary PE, and each PE having a header processing unit for determining where the data is to be sent and a bus interface unit for interfacing with said data conveying means.

4. The apparatus as defined in claim 3, wherein each partner PE maintains, in said memory, a table of the data received and a table of the data sent by said partner PE.

5. The apparatus as defined in claim 1, wherein each primary PE and respective partner PE have means for exchanging acknowledgement messages therebetween.

6. A fault-tolerant bridge/router for being connected to and for interconnecting a plurality of local area networks (LANs) wherein data may pass between said LANs through said bridge/router, said bridge/router comprising:

a plurality of processing elements corresponding to said plurality of LANs, each processing element having a primary I/O port for connecting to and receiving data from a corresponding LAN and a secondary I/O port for connecting to and receiving data from another LAN, and each processing element having a partner processing element having a secondary I/O port for connecting to said corresponding LAN so that each processing element receives the identical data from said corresponding LAN at its primary I/O port as its partner processing element receives from said corresponding LAN at its secondary I/O port;

means connected to said processing elements for conveying data therebetween;

said processing elements further comprising means for sending and receiving data via said I/O ports, means for storing said received data, means for sending and receiving data with other processing elements via said conveying means, and means for retrieving stored data and for processing said data, said retrieving and processing means of said partner processing elements normally maintaining an inactive state;

means, connected to said processing elements for determining if a processing element fails; and means responsive to said determining means for activating said retrieving and processing means of said partner processing element of the failed processing element so that the data normally processed by said failed processing element may be processed by said partner processing element, whereby data from a first LAN may be input to the bridge/router through the primary I/O port of a first processing element and output from the bridge/router to a second LAN through the primary I/O port of a second processing element and, where one of said first or second processing elements fails, said data may pass through said secondary I/O port of said partner processing element of said failed processing element.

7. The bridge/router as defined in claim 6, wherein each processing element has a line interface unit connected to said I/O ports, a memory for providing storage for said processing element, a header processing unit for determining where the data is to be sent and a bus interface unit for interfacing with said conveying means.

8. The bridge/router as defined in claim 7, wherein each processing element maintains, in said memory, a table of the data received and a table of the data sent by said processing element.

9. The bridge/router as defined in claim 6, wherein each processing element and respective partner processing element have means for exchanging acknowledgement messages therebetween.

10. A processing element for use in a fault-tolerant bridge/router for being connected to and for interconnecting a plurality of local area networks (LANs) wherein data may pass between said LANs through said bridge/router, said bridge/router being configured for receiving a plurality of processing elements and having means for conveying data therebetween, said processing element comprising:

a primary I/O port for connecting to a corresponding LAN;

a secondary I/O port for connecting to another LAN;

means for interfacing with said conveying means;

means, connected to said conveying means, for exchanging messages with another processing element;

means, connected between said primary I/O port and said conveying means interface means, for processing data passing therebetween;

means, connected between said secondary I/O port and said conveying means interface means, for storing data from said secondary I/O port and for storing data from said conveying means; and means, responsive to said message exchanging means, for sending to said secondary I/O port said stored data from said conveying means and for sending to said conveying means said stored data from said secondary I/O port.

11. The processing element as defined in claim 10 wherein said conveying means interface means is a bus interface unit.

* * * * *